(12) United States Patent
Chomel et al.

(10) Patent No.: US 9,017,594 B2
(45) Date of Patent: *Apr. 28, 2015

(54) METHOD AND DEVICE FOR FORMING CONTAINERS USING A VENTILATED BOXING INSERT

(75) Inventors: Nicolas Chomel, Octeville sur Mer (FR); Sylvain Auvrey, Octeville sur Mer (FR); Jean-Christophe Langlois, Octeville sur Mer (FR); Arnaud Briard, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 645 days.

This patent is subject to a terminal disclaimer.

(21) Appl. No.: 13/132,409

(22) PCT Filed: Dec. 1, 2009

(86) PCT No.: PCT/FR2009/001365
§ 371 (c)(1),
(2), (4) Date: Aug. 24, 2011

(87) PCT Pub. No.: WO2010/063901
PCT Pub. Date: Jun. 10, 2010

(65) Prior Publication Data
US 2011/0298161 A1  Dec. 8, 2011

(30) Foreign Application Priority Data
Dec. 3, 2008  (FR) .................................... 08 06797

(51) Int. Cl.
*B29C 49/32* (2006.01)
*B29C 49/70* (2006.01)
*B29C 49/48* (2006.01)
*B29K 67/00* (2006.01)

(52) U.S. Cl.
CPC ............. *B29C 49/70* (2013.01); *B29C 49/4802* (2013.01); *B29C 2049/4807* (2013.01); *B29C 2049/4812* (2013.01); *B29C 2049/702* (2013.01); *B29K 2067/00* (2013.01)

(58) Field of Classification Search
None
See application file for complete search history.

(56) References Cited

U.S. PATENT DOCUMENTS 4,064,208 A * 12/1977 Hanning .......................... 264/39
4,123,217 A   10/1978 Fischer et al.
2009/0139996 A1  6/2009 Jacson et al.

FOREIGN PATENT DOCUMENTS

| JP | 59-1226 A | 1/1984 |
| WO | 2007/016959 A1 | 2/2007 |
| WO | 2007/020346 A1 | 2/2007 |

* cited by examiner

*Primary Examiner* — Monica Huson
(74) *Attorney, Agent, or Firm* — Sughrue Mion, PLLC

(57) ABSTRACT

A forming method, in a mold provided with a wall forming a cavity, of a container from a blank, which includes a boxing operation of pushing back the material of the blank by an insert movably mounted with respect to the wall of the mold between a retracted position in which the insert is retracted into the wall, and a deployed position in which the insert protrudes with respect to the wall, in order to form on the container, by pushing back, a hollow reserve projecting toward the interior of the container. Additionally, a local pressurization operation is performed, after formation of the hollow reserve, of injecting a pressurized fluid between the insert and the hollow reserve.

19 Claims, 5 Drawing Sheets

METHOD AND DEVICE FOR FORMING CONTAINERS USING A VENTILATED BOXING INSERT

CROSS REFERENCE TO RELATED APPLICATIONS

This application is a National Stage of International Application No. PCT/FR2009/001365 filed Dec. 1, 2009, claiming priority based on French patent application Ser. No. 08/06797, filed Dec. 3, 2008, the contents of all of which are incorporated herein by reference in their entirety.

The invention concerns the forming of containers from blanks made of thermoplastic material, and more specifically the forming of containers provided with hollow reserves such as integrated handles.

By way of review, the manufacture of containers generally comprises a blowing operation that takes place in a mold, the wall of which defines a cavity inside which the blank is inserted; during blowing, the blank presses against the wall under the effect of the high gaseous pressure in the blank, previously heated to allow its plastic deformation.

Some containers can be provided with hollow reserves that are formed to project toward the interior of the container and are produced for such purposes as aesthetics (such as the creation of curves), structural (for example to produce panels intended to absorb the deformation of the container during hot filling) or functional (to produce a handle for gripping the container).

To form this type of container, one known technique consists of using a mold fitted with a movable insert initially retracted into the wall of the mold and deployed when the container is present during formation in the mold in order to push back the material when it reaches the wall, as is illustrated in European patent applications EP 1 922 256 (SIDEL) or EP 345518 (TOAGOSEI).

This technique is not without its own disadvantages. In the first place, the formation of the hollow reserves, which requires the deployment of the insert, slows the unit cycle time by several tenths of a second, and given rates of several thousand cycles per hour, this results in a significant drop in productivity compared to ordinary containers (i.e. those without reserves).

Furthermore, the penetration of the insert results in a phenomenon of adherence of the material of the container to the front surface of the insert (in contact with the reserve), which makes demolding tricky because the retraction of the insert can cause local deformations of the material, and ultimately at least a defect in appearance of the container that could result in its rejection.

An objective of the invention is to remedy these problems by proposing a solution making it possible to facilitate the demolding of a container having a hollow reserve.

To that end, the invention first proposes a method of forming, in a mold provided with a wall forming a cavity, a container from a blank, which comprises:

A boxing operation consisting of locally pushing back the material of the blank by means of an insert movably mounted with respect to the wall of the mold between a retracted position in which the insert is retracted into the wall, and a deployed position in which the insert protrudes with respect to the wall, in order to form on the container a hollow reserve projecting toward the interior of the container;

A local pressurization operation, after formation of the hollow reserve, consisting of injecting a pressurized fluid between the insert and the hollow reserve.

Secondly, the invention proposes a device for forming a container from a blank, which comprises:

A mold provided with a wall defining a cavity;

A boxing insert movably mounted with respect to the wall of the mold between a retracted position in which the insert is retracted into the wall, and a deployed position in which the insert protrudes with respect to the wall, toward the interior of the cavity, in order to form on the container, by pushing back, a hollow reserve projecting toward the interior of the container, said insert having a front surface capable of coming into contact with the hollow reserve;

A system for injecting a pressurized fluid, formed at least partially in the insert and opening onto the front surface.

In this way, the adherence of the material to the insert is prevented, which facilitates the demolding of the container and makes it possible to gain several tenths of a second in the cycle time, thus benefiting the rate of manufacture.

Moreover, by injecting a thermally regulated fluid, local cooling of the hollow reserve thus formed can be achieved, which contributes to the rigidification of the container, thus reducing the cycle time even more.

Other objects and advantages of the invention will be seen from the following description provided with reference to the appended drawings in which.

Figure 1:
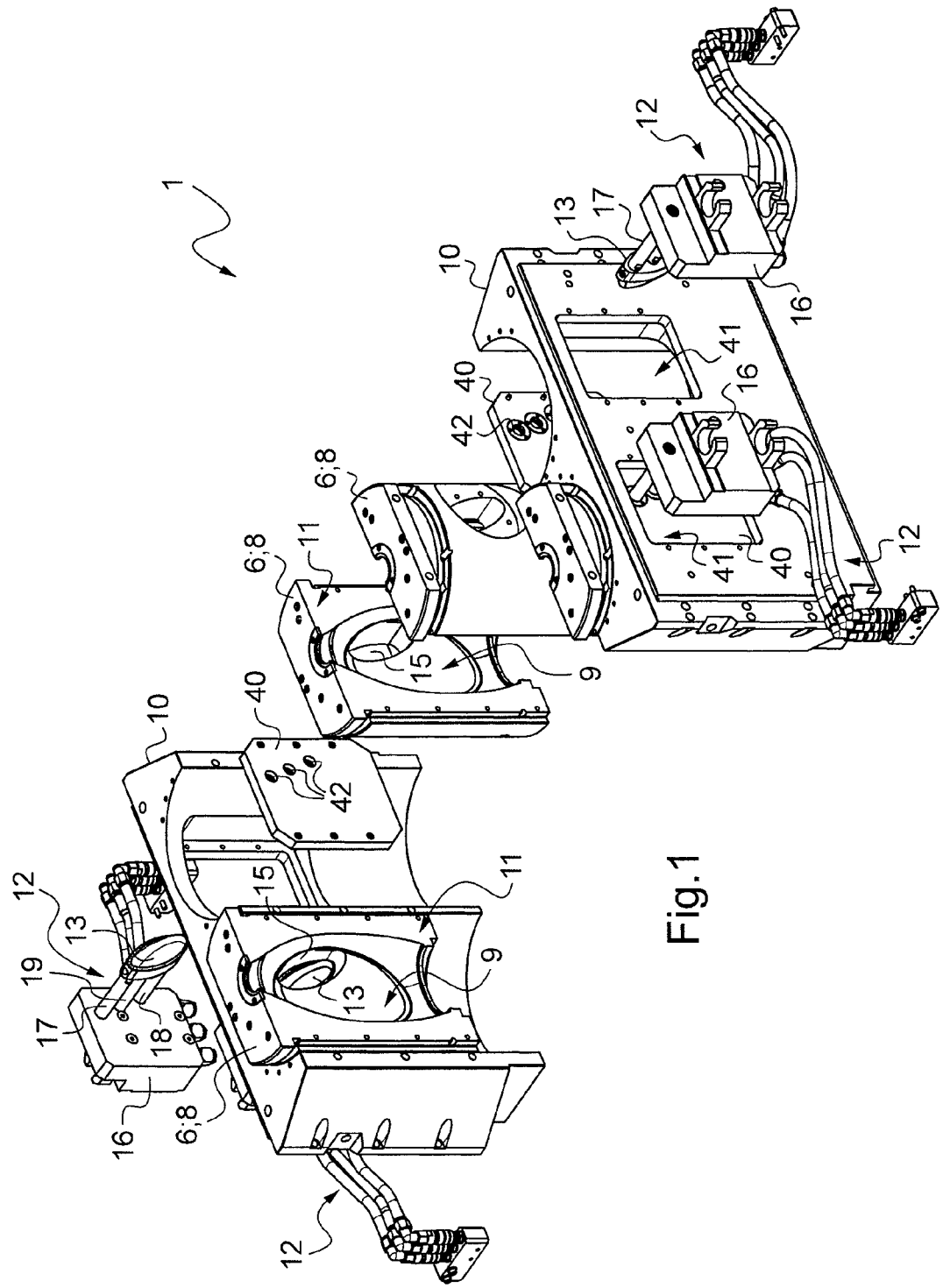
FIG. 1 is an exploded view in perspective showing a container forming unit equipped with a device according to the invention.

Partially represented in FIG. 1 is a forming unit 1 for a machine to manufacture containers 2 from blanks 3 of plastic material such as PET (polyethylene terephthalate). The term "blank" is used here to designate preforms intended to be blown, or intermediate containers having undergone a first series of operations in a first mold (for example pre-blowing) and intended to undergo a second series of operations in a second mold (for example blowing). The term "forming" is used to designate both a pre-blowing or blowing operation on a preform, as well as a finishing operation on an intermediate container.

In the illustrated embodiment, corresponding to the following description, the blanks 3 are intermediate containers, and the forming unit 1 is configured to perform a boxing operation on intermediate containers 3 having undergone pre-blowing and blowing operations. Upon completion of these operations, each intermediate container has on its body two symmetrical protrusions 4 the boxing of which causes them to turn over toward the interior of the container 2, and the subsequent formation of two hollow reserves 5 which together form a handle for gripping the container 2.

As is represented in FIG. 1, the forming unit 1 is of the linear type and comprises a plurality of molds 6 each provided with a wall 7 defining a cavity intended to receive a blank.

More specifically, each mold 6 comprises two mold halves 8, each provided with a half-cavity 9. The mold halves 8 are mounted facing each other on two mold carriers 10 that are movable in horizontal translation with respect to a fixed frame (not shown) of the forming unit 1, along a transverse direction perpendicular to a longitudinal direction of feed of the blanks, between:

a closed position in which the mold carriers 10 are brought together, the mold halves 8 being in mutual contact by a joint plane 11 and the half-cavities 9 jointly forming the cavity of the mold 6;

an open position (illustrated in FIG. 2) in which the mold carriers 10 are separated from each other to allow the evacuation of the containers 2 and the loading of the blanks 3.

For a more precise description of the kinetics, and one possible embodiment of a system to control the opening and closing of the molds 6, reference can be made to European patent No. 1 924 421 in the name of the applicant.

The forming unit 1 further comprises at least one boxing device 12. Said device 12 comprises a boxing insert 13 provided to push back the wall of the blank 3 at each protrusion 4 in a manner similar to a punch, in order to form, by turning over around an articulation zone or hinge 14, a hollow reserve 5 projecting toward the interior of the container 2.

In this instance, the forming unit 1, configured to accept two blanks 3, comprises two boxing devices 12 mounted facing each other, which are provided to perform a simultaneous boxing of the blank 3 on either side of the joint plane 11 and to produce two symmetrical hollow reserves 5 which together form a handle. Each boxing device 12 therefore comprises two boxing inserts 13 mounted parallel to each other and moving simultaneously.

Each insert 13, produced from a thermally conductive material (i.e. having a high coefficient of thermal conductivity, such as an aluminum alloy) is mounted movable in translation with respect to the corresponding half mold 8, between a retracted position in which the insert 13 is withdrawn into the wall 7 and a deployed position in which the insert 13 projects outward with respect to the wall 7.

In order to allow the passage and movement of the insert 13, each half mold 8 is provided with a recess 15 made transversely and the contour of which corresponds to the surface traced by the insert 13, with sufficient clearance to allow circulation of air around the insert 13, for reasons that will be explained below.

The boxing device 12 is designed to allow the quick mounting and dismounting of the inserts 13 so as to allow the interchangeability of the inserts 13, either for purposes of repair, or to adapt the unit 1 to forming containers of a different shape or capacity.

In addition to the insert 13, each boxing device 12 comprises a plate 16 substantially parallelepiped in shape, on which the insert 13 is rigidly attached by means of three superimposed rods, i.e. an upper rod 17, a lower rod 18 and a central rod 19 anchored in an anterior face of the plate 16.

Figure 7:
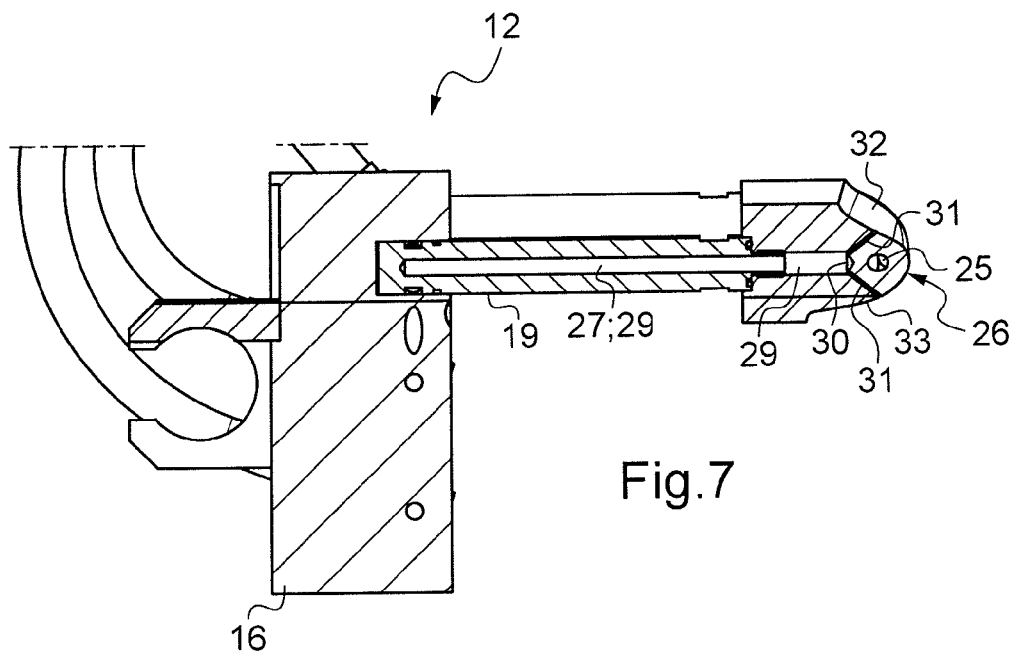
FIG. 7 is a transverse cross-sectional view of the boxing module of FIG. 6.

As illustrated in FIG. 7, the boxing device 12 is provided with a system 20 for heating the insert 13, which comprises a feed line 21 for a heat exchange fluid and a line 22 for the evacuation of said fluid, drilled in the plate 16 and connected to two bores 23, 24 made respectively in the upper rod 17 and in the lower rod 18 and passing through the insert 13. A duct 25 made in the insert 13 connects the bores 23, 24 to allow the circulation of the fluid and the heating of the insert 13.

The heat exchange fluid is for example water heated to a temperature equal to or greater than the glass transition temperature of the material of which the container 2 is composed (i.e. about 80° C. for PET).

The heating of the insert 13 makes it possible to at least maintain the temperature of the blank 3, at its protrusions 4, at a high value (in the vicinity of the glass transition temperature) where the material is sufficiently malleable so that turning over the protrusions 4 is easy and the stresses exerted on the material does not cause unwanted deformation of the container 2.

The forming unit 1 further comprises local means of injecting a pressurized fluid into the recess 15, at a front surface 26 of the insert 13.

Said injection means comprise an injection system 27 equipping the boxing device 12 and comprising a fluid feed line 28 made in the plate 16, connected to a bore 29 made in the central rod 19 and terminating at a distal end 30 in the insert 13. Said end 30 is connected to two secondary V-shaped channels 31 which open onto the front surface 26 of the insert 13; more specifically, the insert 13 being oblong in shape, the front surface 25 has two opposite sides 32, 33 each of which opens into a channel 31.

Said injection system 27 makes it possible, upon completion of the boxing of the protrusion 4, to create a film of pressurized fluid between the front surface 26 of the insert 13 and the reserve 5, which facilitates the detachment of the insert 13 from the container 2, prior to the retraction of the insert 13 and the ejection of the container 2 when the mold 6 is opened.

The fluid is preferably air at a relative pressure of at least 1 bar, but can be increased to a higher value such as between 10 and 30 bars. A value of 15 bars is suitable for the application described below.

The lines 21, 22, 28 open onto a lower face of the plate 16. Connectors 34 screwed into the openings of the lines 21, 22, 28 connect said lines respectively to flexible feed and evacuation tubes 35, 36 for evacuating the heat exchange fluid, and to a flexible gas feed line connected to a source of pressurized gas.

Figure 4:
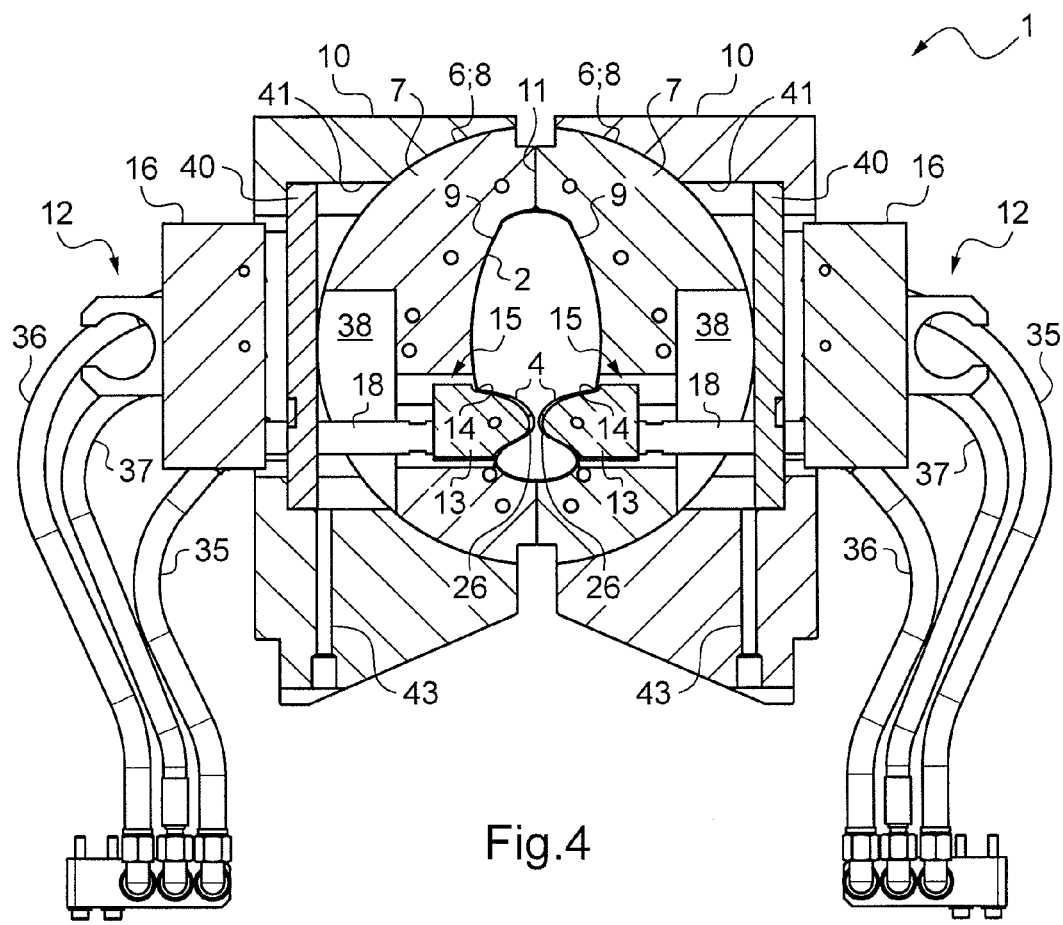
FIG. 4 is a view similar to FIGS. 2 and 3, showing the forming unit in a boxing configuration of the container.
Figure 5:
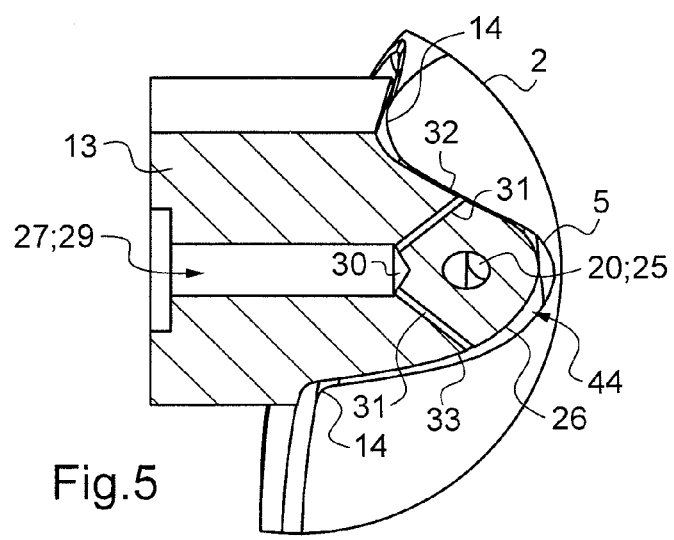
FIG. 5 is a partial cutaway view in another sectional plane, showing a detail of the forming unit of FIG. 4.
Figure 6:
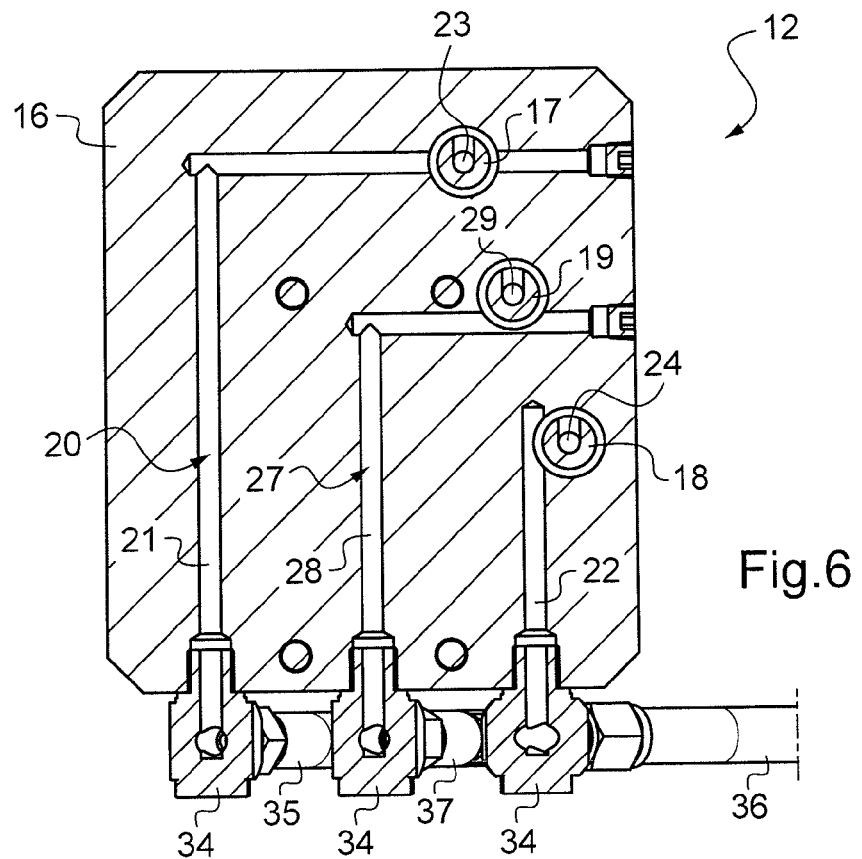
FIG. 6 is a sectional front view in the plate of the boxing module equipping the forming unit of the preceding figures.

According to a preferred embodiment illustrated in FIGS. 4 and 5, the evacuation of the gas injected at the front surface 26 of the insert 13 is accomplished by the mold carrier 10, in which, behind the half mold 8 a compensation chamber 38 is provided, formed by a recess made in the mold carrier 10 beyond the cylindrical impression corresponding to a rear face 39 of the half mold 8.

Said compensation chamber 38 is sealably closed, opposite the half mold 8, by a plate 40 which seals an opening 41 made in the half mold 8 in order to allow frontal manual access to the boxing device 12.

Said plate 40 includes three superimposed holes 42 in which the rods 17, 18, 19 are slidably mounted to allow the translation movement of the boxing device 12. The sealing of the passage of the rods 17, 18, 19 through the holes 42 can be ensured by dynamic lip seals mounted in counterbores formed in the plate 40 around each hole 42.

The compensation chamber 38 is delimited, facing the plate 40, by the rear face 39 of the mold carrier 8.

The pressurized gas in the recess 15 and in the compensation chamber 38 (which communicates with the part of the recess 15 situated upstream from the insert 13—i.e. before the front surface 26—by the clearance around the insert 13) can be evacuated to the exterior by a transverse duct 43 made in the mold carrier 10 and opening into the chamber 38, as illustrated in FIG. 4. Said duct 43 is advantageously connected to a muffler (not shown) arranged at the exterior of the mold carrier 10, making it possible to absorb at least part of the noise due to the decompression of the chamber 38.

The method of forming containers by implementing the forming unit 1 just described can be summarized as follows.

Figure 2:
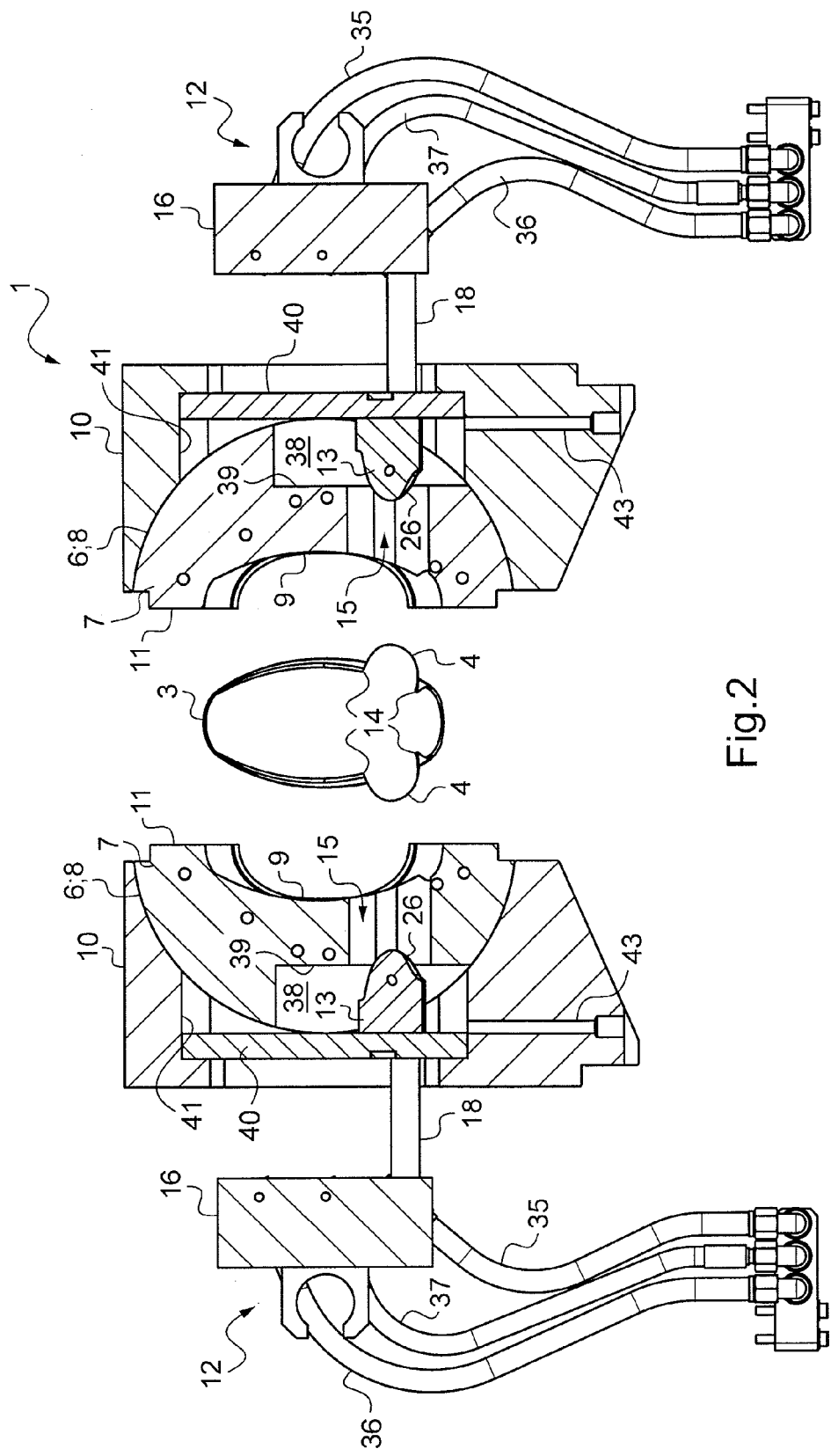
FIG. 2 is a transverse cross-sectional view of the forming unit of FIG. 1, shown in an open configuration during the loading of an intermediate container.
Figure 3:
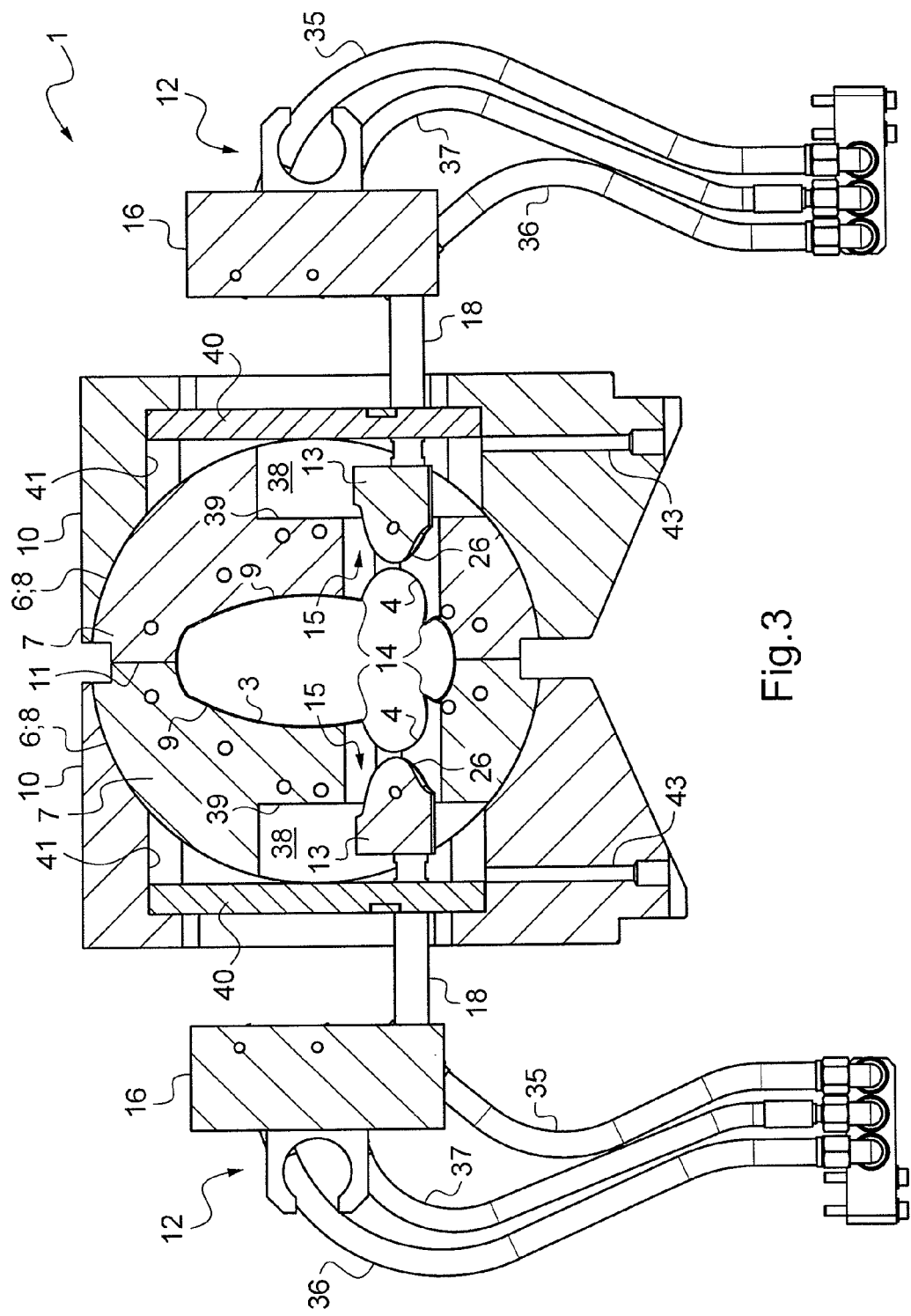
FIG. 3 is a view similar to FIG. 2, showing the forming unit in a closed configuration after the loading of an intermediate container, and prior to the boxing thereof.

The intermediate container 3 is first loaded into the mold 6, in the open position and with the inserts in the retracted position (FIG. 2). The mold 6 is then closed, the inserts 13 being maintained in the retracted position. The general shape of the intermediate container 3 corresponds to the cavity of the mold 6, the protrusions 4 being received in the openings 15 facing the inserts 13, a short distance therefrom.

When the boxing operation is initiated by which each protrusion 4 is pushed back transversely by the translation of the corresponding insert 13 to its deployed position, in order to form, by overturning around the hinge 14, a hollow reserve 5 projecting toward the interior of the container 2.

Air is then injected locally by the system 27 in order to pressurize, via the feed line 28, via the bore 29 and via the channels 31, the interface between the front surface 26 of the insert 13 and the reserve 5 and thus create a gap 44 between them to facilitate the separation upon completion of the boxing.

Upon completion of this pressurization operation, which lasts a fraction of a second, the depressurization is initiated (to the open air or in communications with a muffler) of the compensation chamber 38 (and therefore of the recess 15) via the duct 43. The evacuation of the air is accompanied by an endothermic relaxation that contributes to cooling—and thus to rigidifying—the container, and more particularly the reserves 5.

The invention claimed is:

1. A forming method, in a mold provided with a wall forming a cavity, of a container from a blank made of a material, which comprises:
   A boxing operation comprising locally pushing back the material of the blank by an insert movably mounted with respect to the wall of the mold between a retracted position in which the insert is retracted into the wall, and a deployed position in which the insert protrudes with respect to the wall, in order to form on the container, by pushing back, a hollow reserve projecting toward an interior of the container;
   A local pressurization operation, after formation of the hollow reserve, comprising injecting a pressurized fluid between the insert and the hollow reserve, to create a film of pressurized fluid between a front surface of the insert and the hollow reserve, prior to the retraction of the insert and the ejection of the container when the mold is opened.

2. The method according to claim 1, which comprises, upon completion of the local pressurization operation, a depressurization operation comprising evacuating the fluid injected during the pressurization operation.

3. The method according to claim 1, wherein the fluid used during the pressurization operation is pressurized air.

4. A device for forming a container from a blank, which comprises:
   A mold provided with a wall defining a cavity;
   A boxing insert movably mounted with respect to the wall of the mold between a retracted position in which the insert is retracted into the wall, and a deployed position in which the insert protrudes with respect to the wall, toward an interior of the cavity, in order to form on the container, by pushing back, a hollow reserve projecting toward the interior of the container, said insert having a front surface configured to come into contact with the hollow reserve;
   A system for injecting a pressurized fluid, formed at least partially in the insert and opening onto the front surfacer; and
   a compensation chamber for the evacuation of the pressurized fluid.

5. The device according to claim 4, wherein the injection system comprises a fluid feed line connected to at least one channel formed in the insert and opening onto the front surface.

6. The device according to claim 5, wherein the injection system comprises two V-shaped channels formed in the insert and opening onto two opposite sides of the front surface of the insert.

7. The device according to claim 4, comprising a mold carrier to which the mold is attached, and a system for evacuating the fluid from the recess that is made in the mold carrier.

8. The device according to claim 7, wherein said evacuation system comprises a compensation chamber made in the mold carrier and a duct made in the mold carrier and opening into the compensation chamber.

9. The device according to claim 4, comprising a system for heating the insert, which comprises a line to feed the heat exchange fluid to the insert, and a line to evacuate the heat exchange fluid from the insert.

10. A machine for manufacturing containers, comprising the device according to claim 4.

11. A device for forming a container, which comprises:
    a mold provided with a wall defining a cavity;
    a blank in the cavity;
    a boxing insert movably mounted with respect to the wall of the mold between a retracted position and a deployed position in which the insert protrudes from the wall toward an interior of the cavity in order to form on the container a hollow reserve projecting toward the interior of the container, the insert having a front surface configured to contact the container in forming the hollow reserve;
    a fluid injection system configured to deliver pressurized fluid in the cavity between the insert and the hollow reserve; and
    a compensation chamber for the evacuation of the pressurized fluid.

12. The device according to claim 11, wherein the fluid injection system comprises a fluid feed line connected to at least one channel.

13. The device according to claim 12, wherein the channel is formed in the insert and opens onto the front surface of the insert.

14. The device according to claim 11, wherein the pressurized fluid comprises air pressurized to about 10 to 30 bars.

15. The device according to claim 11, wherein the compensation chamber is disposed opposite to a wall of a half mold and sealable by a plate provided to the half mold which seals an opening in the half mold which allows frontal manual access to the boxing device.

16. The device according to claim 11, wherein the compensation chamber is delimited by a plate and a rear face of a mold carrier.

17. The device according to claim 11, configured so that the pressurized fluid can be evacuated via a transverse duct provided to a mold carrier and opening into the compensation chamber.

18. The device of claim 11, configured so that a film of the pressurized fluid is created between the insert and the hollow reserve, prior to the retraction of the insert and the ejection of the container when the mold is opened.

19. The device of claim 4, wherein the system for injecting a pressurized fluid is configured to create a film of the pressurized fluid between a front surface of the insert and the hollow reserve, prior to the retraction of the insert and the ejection of the container when the mold is opened.

* * * * *